United States Patent [19]

Ziccarelli et al.

[11] 4,296,136

[45] Oct. 20, 1981

[54] COCONUT POWDER

[75] Inventors: Salvatore F. Ziccarelli, Downers Grove; Rey C. Ramos; Robert M. Brown, both of Chicago, all of Ill.

[73] Assignee: Beatrice Foods Company, Chicago, Ill.

[21] Appl. No.: 117,797

[22] Filed: Feb. 1, 1980

[51] Int. Cl.$^3$ ............................................. A23L 1/221
[52] U.S. Cl. ................................. 426/533; 426/617; 426/650; 426/431; 426/471; 426/489
[58] Field of Search ............... 426/617, 431, 533, 471, 426/518, 519, 489, 650

[56] References Cited

U.S. PATENT DOCUMENTS

| | | | |
|---|---|---|---|
| 3,573,064 | 3/1971 | Noznick et al. | 426/617 |
| 3,655,409 | 4/1972 | Glasser et al. | 426/532 |
| 3,860,725 | 1/1975 | Forkner | 426/617 |
| 3,899,606 | 8/1975 | Forkner | 426/617 |
| 4,098,912 | 7/1978 | Flores et al. | 426/431 |

Primary Examiner—Jeanette M. Hunter
Attorney, Agent, or Firm—Murray and Whisenhunt

[57] ABSTRACT

There is provided a process for producing reconstitutable natural coconut flavor by grinding coconut meat preferably from which the germ eye has been removed, until a pulp of coconut fiber and coconut flavor liquor is obtained. The pulp is separated into the flavor liquor and fiber, wherein the liquor has no more than 2% fiber therein. The liquor is heat treated under enzyme deactivation conditions, whereby any deleterious coconut enzymes in the liquor are deactivated. The liquor is concentrated by condensing the liquor to more than 25% solids or spray drying the liquor to a free-flowing powder. The concentrated coconut flavor may be reconstituted with an aqueous diluent to provide a liquid coconut flavor. The coconut flavor is a mixture of coconut fat and coconut protein/carbohydrate in ratios of 40–72:60–28 and the coconut flavor in the reconstituted form contains no more than 2% coconut fiber.

23 Claims, 2 Drawing Figures

COCONUT POWDER

The present invention relates to a reconstitutable natural coconut flavor and to the method of producing that flavor, particularly to such flavor and method, wherein the flavor can be reconstituted to a liquid coconut flavor that does not contain a gritty texture or mouth feel and which can be used in food compositions in any amount, without introducing such undesired texture or mouth feel.

BACKGROUND OF THE INVENTION

Coconut flavor is a popular flavor and is used widely in confectionaries, bakery products, fruit compositions, toppings, whips, and the like. Conventionally, coconut flavor is introduced into such food compositions by way of dehydrated coconut meat or "coconut cream", made by highly mascerating the meat and juice of the coconut. For many fruits and vegetables, the characteristic flavor thereof is obtained from the "juice", e.g., grape juice, tomato juice, celery juice, etc. However, contrarily, the juice associated with the coconut, i.e., the "milk", does not have the characteristic coconut flavor therein. Accordingly, for coconut flavoring purposes, it is necessary to use the coconut meat.

In one process for producing coconut flavoring, the natural meat is shredded or grated and dehydrated to a shelf-stable form, often including substantial amounts of sugar for preservation purposes. The dehydrated coconut is rehydrated prior to use in or while in food compositions to impart the characteristic coconut flavor thereto. However, coconut meat, either in the natural state or in the dehydrated form, contains substantial amounts of non-soluble matter referred to as "fiber". When dehydrated coconut meat is used, the fiber imparts a somewhat chewy and tough characteristic to the composition in which it is included. Further, the shredded form imparts a rather rough texture to the food composition. When the dehydrated coconut meat is used in the grated form, the fiber produces a somewhat gritty texture and mouth feel. While the grated form is considerably preferable to the shredded form in many uses, i.e., ice cream, whips, toppings, confectionaries, and the like, the gritty texture and mouth feel is quite undesirable. Some efforts have been made in the art to mitigate these effects, but those efforts have not been entirely satisfactory, especially from an economical point of view. For example, U.S. Pat. No. 3,899,606 teaches treatment of coconut meat at elevated temperatures with an aqueous solution of an acid, such as hydrochloric acid, to tenderize the meat by cell disruption, but as that patent points out, the process results in some modification of the natural coconut flavor and a relatively mild flavor results. In another process, as described in U.S. Pat. No. 3,655,409, flash steaming of the coconut meat is suggested to fissure the structure of the coconut, into which is infused a glycerol.

In another version of a process which utilizes essentially the whole coconut, U.S. Pat. No. 4,098,912, teaches a process where the juice of coconuts is separated from the meat and after heating the juice (with water added thereto), it is recombined with the fresh coconut meat on an equal weight basis. The combination of juice and meat is ground to a pulp and the pulp is pressed through a perforated conical press to obtain "coconut cream", which is heated, compounded with additives (such as sucrose), heated to a high temperature, e.g., 189° F., for a prolonged period of time, e.g., 20 minutes, homogenized and bottled or canned. However, the presence of the juice (which contains mainly the sugar) in the "coconut cream", may cause considerable difficulty in that the sugar may discolor the "coconut cream" during the long, high temperature heating. Additionally, the "coconut cream" will contain most of the fiber of the coconut meat, which results in undesired taste and mouth-feel.

Accordingly, processes have been proposed in the art to provide coconut flavor wherein rather than using the whole coconut meat, the flavor liquid of the meat is used. These efforts have been only partially successful. Some of the processes result in a product where much of the characteristic fresh coconut flavor is lost. Other of the processes result in a product which is not shelf-stable for substantial periods of time and unwanted off-flavors rapidly occur. Yet other of the processes produce a product which cannot be provided in either a significantly condensed or powdered form, and, accordingly, interfere in flavoring food compositions because of the bulk involved. Finally, other of the processes produce flavors which develop unwanted off-flavors with storage.

A significantly improved process in the above regards is disclosed in U.S. Pat. No. 3,573,064. That process avoids that problem of undue bulk by providing a powdered coconut flavor produced only from the coconut meat. In the process, the juice is discarded and the fresh meat is ground with water until a pulp having an average particle size of 200 microns or less is achieved. The pulp is filtered and the filtrate does not have particles over 30 microns therein. The filtrate is compounded with a protein carrier and emulsifier and dried, e.g., spray dried. While this process produce a powdered coconut flavor, the requirement to grind the meat to 200 microns or less and filter to a finness of 30 microns or less presents difficult processing steps. In addition, during storage of the powder, unwanted "soapy-like" flavor may develop.

OBJECTS OF THE INVENTION

It is therefore an object of the invention to provide a process for producing reconstitutable natural coconut flavor, in a concentrated form, wherein the concentrated coconut flavor may be reconstituted with an aqueous diluent to provide liquid coconut flavor or used in the concentrated form in a food and wherein the coconut flavor has no unwanted texture or mouth feel in food compositions. It is a further object of the invention to provide such coconut flavor in such concentrated form which is stable for long periods of time without developing unwanted off-flavors. It is a further object of the invention to provide such coconut flavor which can be easily reconstituted and will homogeneously mix in food compositions. It is another object of the invention to provide processes for producing such coconut flavor. Other objects will be apparent from the following detailed description and the annexed claims.

BRIEF DESCRIPTION OF THE INVENTION

Figure 1:
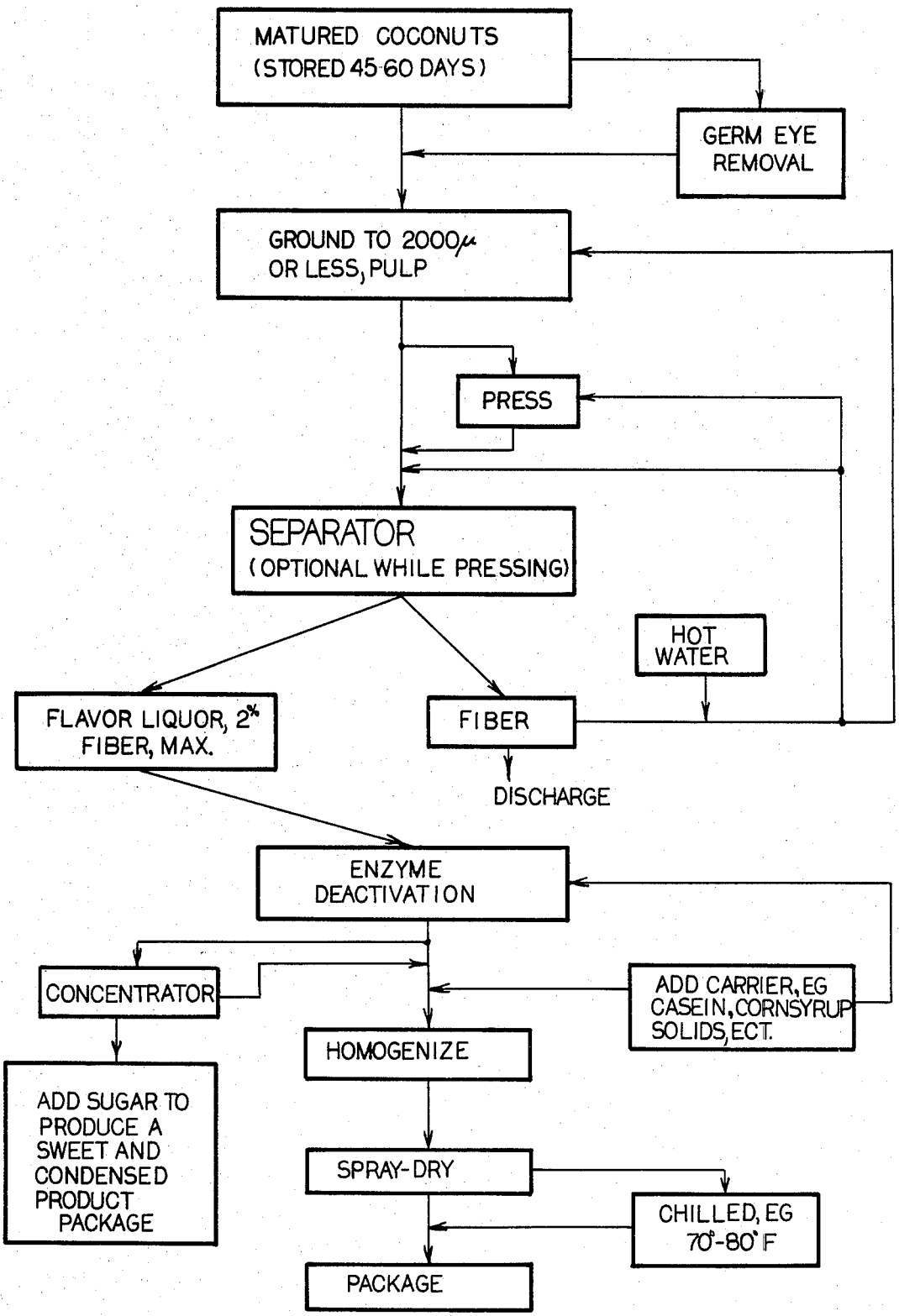
FIG. 1 is a diagrammatic outline of the steps of the process, including all of the major optional steps.

The invention is based on several primary discoveries. Firstly, it was discovered that unwanted off-flavors developed in products produced by the prior art because of certain enzymes which remained in those prior art coconut flavor. During processing and storage those enzymes caused degradation of the coconut flavor and produced unwanted off-flavors. To avoid this difficulty, it was discovered that the enzymes must be either essentially eliminated from the coconut meat or deactivated by special processing or, preferrable, both.

A second basic discovery of the present invention is that the coconut meat must be ground to a relatively small particle size, i.e., 2000 microns or less, but it need not be ground to 200 microns or less, as was taught by the prior art. This greater latitude in grinding considerably simplifies the process. That grinding must, however, be such that a pulp of the coconut meat fiber and coconut flavor liquor is obtained. This is usually achieved by high shear and/or, preferably, impact grinding which liberates the coconut flavor liquor from the coconut meat fiber. When grinding to that small particle size is achieved, the fiber is so ruptured as to expel the coconut flavor components and a balanced coconut flavor is obtained.

The third major discovery is that the so expelled coconut flavor liquor can thereafter be separated from the coconut fiber so that the separated coconut flavor liquor contains no more than 2% of coconut fiber. With such low level of coconut fiber therein, the coconut flavor, may be incorporated into food compositions without producing a gritty texture or mouth feel, as was associated with prior art products. Further, with such low levels of fiber therein, the present coconut flavor is easily reconstitutable into a liquid which is homogeneously mixable in food compositions.

The present coconut flavor can be concentrated into convenient form, i.e., by condensing the coconut flavor liquor to more than 25% solids or spray drying the coconut flavor liquor to a free-flowing powder.

Thus, briefly stated, there is provided a process for producing reconstitutable natural coconut flavor comprising grinding coconut meat to an average particle size of 2000 microns or less and until a pulp of coconut meat fiber and coconut flavor liquor is obtained. The coconut flavor liquor is separated from the coconut meat fiber in such a manner that the separated liquor has no more than 2% fiber therein. The enzymes in the liquor are then deactivated by heating the flavor liquor at a temperature and for a time within enzyme deactivation conditions, whereby the enzymes in the liquor are deactivated.

The deactivated liquor is then concentrated to a concentrated form by a step selected from (a), condensing the liquor to more than 25% solids, or (b) spray drying the liquor to a free-flowing powder. A concentrated coconut flavor is thereby obtained.

There is also provided a concentrated, reconstitutable natural coconut flavor comprising a mixture of coconut fat and coconut protein/carbohydrate in ratios of 40–72:60–28, wherein the flavor in the reconstituted form contains less than 2% coconut fiber and the coconut enzymes have been deactivated.

DETAILED DESCRIPTION OF THE INVENTION

Referring to FIG. 1, the coconuts used in the present process should be matured coconuts. It is the matured coconuts which have the developed and balanced coconut flavor. A matured coconut is obtained by picking the coconut just prior to the natural dropping of the coconut from the tree and storing that coconut at ambient conditions for 30 to 70 days, more preferably from 45 to 60 days. Usually the husk of the coconut is removed prior to such storage.

After maturing, the coconut is de-hulled. The de-hulled coconut, containing the tough leathery outer skin (testa) is then carefully examined to determine the position of the germ eye. Coconuts in the shells have three "eyes". Two of these eyes are actually fake, and the third eye is the "germ eye". Those skilled in the art can readily determine the germ eye, since this is the seed portion of the coconut. That germ eye should be cut away, since it is the germ eye that contains the deleterious enzymes, discussed above. It is not absolutely critical that this germ eye be cut away, but if not, then the chances of enzyme action are substantially increased. The testa is peeled, either prior to or after removal of the germ eye and the fresh coconut meat is obtained.

The coconut meat is ground in such a manner as to produce a pulp of the ground (mascerated) coconut meat. The average particle size of the pulp should be 2000 microns or less. However, the finer the grind, the more flavor liquor is obtained. Thus, preferably the average particle size of the pulp is 1500 microns or less and more usually 1000 microns or less. Of course, if desired, the coconut may be finely ground to sizes suggested in the prior art, e.g., to average particle sizes of 200 microns or less. However, this is not required and it is a matter of balancing the amount of flavor liquor obtained versus the increasing difficulty of grinding to smaller particle sizes. With such grinding, the fiberous structure of the coconut meat is sufficiently disrupted to expel from the meat the flavor components of the coconut meat. These flavor components are certain ratios of coconut fat and coconut protein/carbohydrate. The components are expressed in this manner, since the coconut fat is relatively separable from the protein/carbohydrate, while the protein is not readily separable from the carbohydrate.

The grinding may be achieved by conventional grinding and/or shearing devices, such as conventional meat grinders, hammer mills, high speed cutting blades and the like. A preferred grinding device is of the type which has a rotatable cutting head disposed in angularly displaced blades. The Urschel Comitrol* is typical of these machines. Another conventional machine is the Stephan* grinding machine. Also, combinations of these grinding devices may be used, e.g., first grinding in a hammer mill and then in an Urschel Comitrol*. After grinding, the coconut flavor liquor, expelled during grinding is separated from the coconut fiber. This separation may be achieved in any of the conventional manners. Thus, for example, the ground coconut meat pulp may be simply filtered in a conventional filter. Preferably, the ground pulp is pressed to expell liquor from the pulp, either prior to or during the separation step. This latter step may be achieved by conventional pressing and separating machines such as one or more of a screw press, flat plate press, roller press and plate and frame filters, which utilize either mechanical pressure or hydraulic pressure. Alternatively, separation and pressing may be by way of a conventional centrifuge, e.g., a basket-type centrifuge, or a solid bowl-type centrifuge. Even further, combinations of centrifuges and filters may be used, e.g., where the pulp is initially separated in a centrifuge to recover the liquor which is spun out during centrifuging and then further liquor is recovered in a filter press, e.g., a plate and frame filter press. To recover even more of the flavor liquor the ground coconut meat may be further pressed and separation may be performed intermediate of the pressing steps.
*Trademark Additional liquor may be recovered from the separated fiber by resuspending the separated fiber in hot water and recycling that mixture through the separation step to extract more of the liquor. The resuspended fiber may be recycled to the grinding step, to the separation step, or to the pressing step. The temperature of the hot water will usually be between 80° F. and 125° F., and more often between 95° F. and 120° F. The ratio of water to fiber will normally not be greater than 1:1. Finally, however, the spent fiber is discarded from the process.

For the reasons explained above, an enzyme deactivation step is performed. This step may be performed in any order of the process steps subsequent to the separation step and prior to the concentration step. However, most advantageous the deactivation step is performed immediately after the separation step, since at that point all of the flavor liquor has been recovered and deactivation of the liquor is more economical at that point than treating both the liquor and the fiber prior to separation thereof. Therefore, it is preferred that the deactivation step be performed immediately after the separation step.

Unfortunately, when the flavor liquor is allowed to dwell at elevated temperatures, deterioration of the coconut flavor may take place. On the other hand, the liquor must be heat-treated sufficiently to deactivate the enzymes in the coconut flavor liquor. These competing factors have not, here-to-fore, been resolved in the art. In U.S. Pat. No. 3,573,064, noted above, heat treatment of the flavor liquor is not suggested. On the other hand, while U.S. Pat. No. 4,098,912, noted above, does teach heat-treatment, this treatment is in connection with a combination of the coconut meat and the coconut juice, essentially in equal proportions. Since the coconut juice has a flavor distinct from the flavor of coconut liquor obtained from the coconut meat, it is clear that the flavor of the "coconut cream", which is obtained by that process, is not intended to be the same as natural coconut flavor, obtained by the present process. Hence, any flavor deterioration which would take place in that heat-treating process would not be of concern. In that process, the coconut cream is heated to 87° C. (189° F.) for 20 minutes, which would substantially deteriorate the natural coconut flavor.

Figure 2:
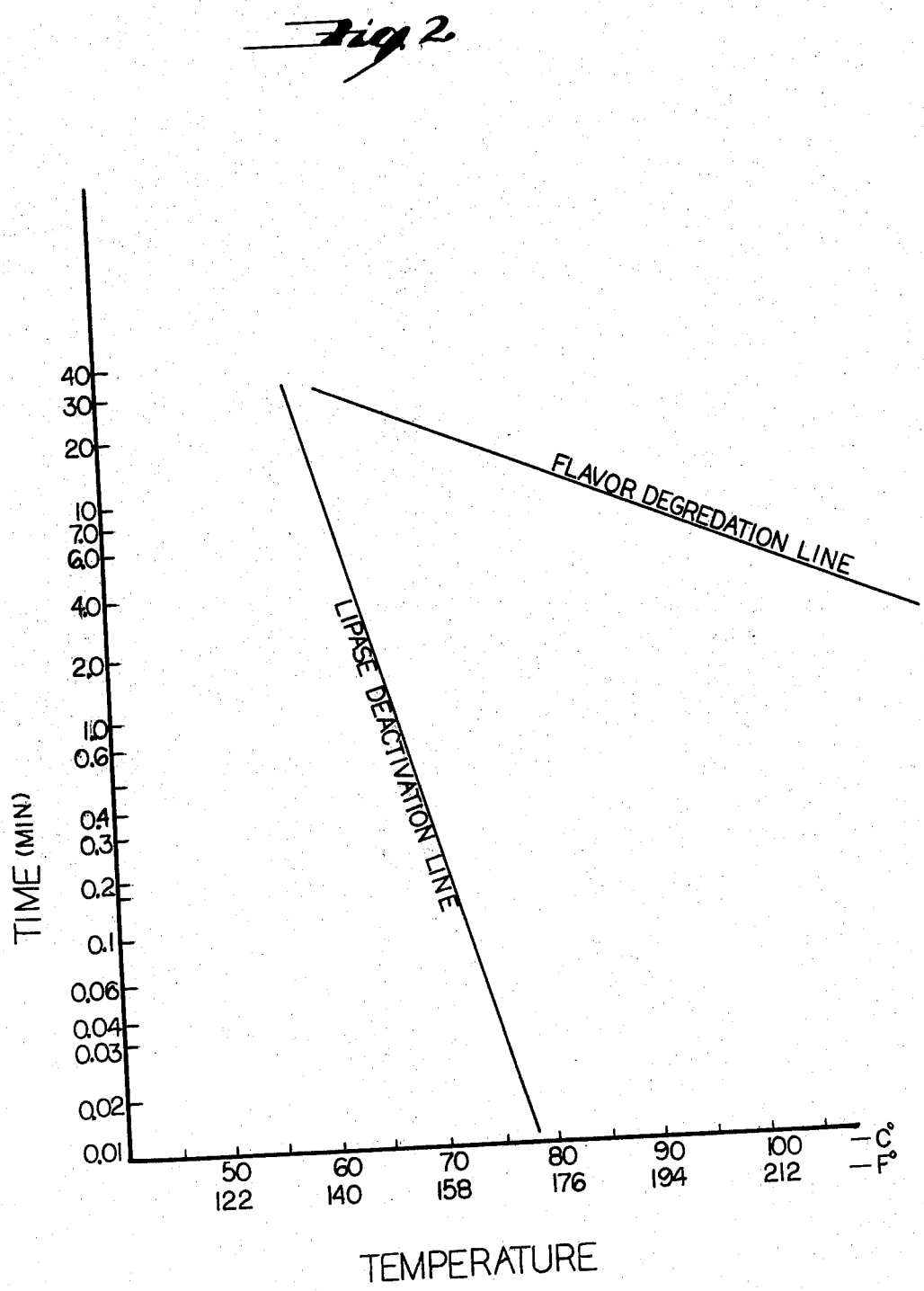
FIG. 2 is a graph showing the critical enzyme deactivation temperature and times.

To avoid substantial flavor deterioration, while yet deactivating enzymes in the coconut meat, the heat-treating conditions must be either at a lower temperature for a longer time or at a higher temperature for a shorter time. FIG. 2 is a graphical representation of the foregoing. The "Lipase Deactivation Line" describes the minimum temperature/time combinations required to deactivate the lipase in the coconut meat. Thus, deactivation of the enzymes is achieved, for example, at 75° C. (167° F.) in 0.03 minutes (1.8 seconds), while deactivation at 65° C. (149° F.) requires nearly 2 minutes. The "Flavor Degradation Line" describes the maximum temperature/time combinations which are permissable if unwanted off-flavors, discussed above, are to be avoided. While these off-flavors may be described in various ways, collectively, the off-flavors are that of a "cooked" flavor, not common to fresh coconut. Here again, for example, at 75° C., the heat-treatment period may not be longer than about 15 minutes, or off-flavors will result, while at 65° C. this period may be as long as about 28 minutes.

Thus, for purposes of the present invention the deactivation temperature/time must be on or above the "Lipase Deactivation Line" but on or below the "Flavor Degradation Line". The temperature/time area between these two lines is defined as "enzyme deactivation temperature/time conditions".

It will also be appreciated from the above, that when the higher deactivation temperatures are used, "High-Temperature-Short-Time" (HTST) heat-treating equipment must be used, since otherwise it would be most difficult to heat the flavor liquor to those higher temperatures, provide the desired dwell time, and then cool the liquor quickly enough so that the dwell time does not exceed the "Flavor Degradation Line". HTST heat-treating equipment is well known in the art and need not be discussed herein.

The flavor liquor is then concentrated in a concentrating step. The liquor will contain substantial amounts of water which does not contribute to the flavor and the removal of that water has three distinct advantages. Firstly, the condensed product is more economically handled because of reduced weight. Secondly, if the concentration step is performed in certain manners the resulting product can be shelf-stable or self-preserving. Thirdly, the bulk of the concentrated flavor is far less than the bulk of the natural flavor liquor and can be incorporated into foods without unduly affecting the food characteristics. Concentration may be achieved by either condensing the liquor to more than 25% solids, preferrably at least 32% solids, or spray drying the liquor to a free-flowing powder.

In condensing the liquor, conventional vacuum pans or evaporators are used whereby the liquor is lightly heated, e.g., up to 140° F. The condensed product may then be packaged in conventional manners, e.g., sterile packs, canning and the like, to provide a condensed coconut flavor. Alternatively, sugar may be added to the condensed liquor to provide a sweet and condensed self-preserving product. The added sugar will be sufficient to substantially reduce deterioration in storage and by simple canning or other sterile packaging, in conventional manners, a sweet and condensed self-preserving product is obtained.

Instead of adding sugar to the condensed liquor, the condensed liquor may be spray-dried to a shelf-stable free-flowing reconstitutable coconut flavor powder. The condensed form is more economical for spray drying than the uncondensed form, and is therefore a preferred form of the process. However, it is not necessary to first condense the liquor and the liquor obtained by the separation step, after deactivation, may be spray dried to a shelf-stable free-flowing, reconstitutable coconut flavor powder.

In either case of spray drying the condensed liquor or the whole liquor, it is preferable to homogenize the liquor prior to spray drying. This insures a homogeneous spray dried product. The homogenization may be carried out with conventional equipment, e.g., a Manton-Gaulin* homogenizer, operated at conventional pressures, e.g., 500 to 3000 psig, and preferably 1000 to 2000 psig, e.g., 1500 psi.
*Trademark Also, a carrier such as caseinates, milk solids, egg protein, lactalbumin, wheat flour, soy isolates, starches, gums, soy flour, casein, corn syrup solids, and the like, may be added to either the condensed liquor or the whole liquor prior to spray-drying. Such carriers aid in the spray-drying operation, as is well known in the art, and the details thereof will not be recited herein for sake of conciseness. The use of the carrier, however, is not required.

In the case of either spray-drying the condensed liquor or the whole liquor, conventional spray-drying temperatures may be used, e.g., 250° to 400° F. inlet, preferably 300° to 350° F. inlet and 150° to 200° F. outlet, e.g., 170° to 225° F. outlet, especially about 180° F. Otherwise, conventional spray-drying equipment is quite acceptable for the present process.

The spray-dried product may be packaged directly upon removal from the spray dryer or it may be chilled prior to packaging, e.g., below 90° F., more usually below 80° F., e.g., from about 40° F. to 75° F. The chilling will aid in avoiding glomeration of the spray-dried product, bearing in mind the high fat content thereof. Chilling is, however, not required.

In either case, the spray-dried product should have a moisture content of less than 5% in order to be shelf-stable. More preferably, the moisture content will be about ¾% to 1½%. The spray-dried product will have a fat content of between about 40% and 72% and the content of the combination of coconut protein and coconut carbohydrate will be between about 60% and 28%, i.e., a ratio of coconut fat to coconut protein/carbohydrate of 40–72:60–28. More usually, the fat content will be about 60% to 70% with corresponding percentages of protein/carbohydrate.

The concentrated product, either in the condensed or the spray dried form, may be directly incorporated into food compositions for flavoring purposes. Often, however, the product will be reconstituted with an aqueous diluent, whereby the reconstituted product will have a solids content comparable to the solids content of the whole liquor prior to concentration. The solids content of the whole liquor will be between about 20% and 60%, and more usually between about 25% and 45%. A typical solids content will be about 32%.

As explained above, it is undesirable that higher amounts of fiber be contained in reconstitutable flavor or in the reconstituted flavor. Thus, the fiber content in the concentrated product should be such that upon reconstitutation thereof the fiber content of the reconstituted form is 2% or less. This will avoid gritty texture or mouth feel in the reconstituted flavor product.

The product either in the concentrated form or the reconstituted form may be used in a wide variety of products. Thus, it may be used in confectionaries such as coconut cream centers, coconut cream snack bars, coconut pastel candies, candy coatings, and the like. It may also be added to alcoholic beverages for providing the coconut flavor, or it may be used to provide a water soluble coconut flavored soft drink. The flavor may also be used in bakery products, such as frosting, icings, and fillings, and in dairy products such as ice creams, novelty foods, milk shakes, and the like. It may also be used as the coconut flavor of ethnic foods, such as curry sauce, rice cakes, and the like. The flavor is also useful in frozen products such as curried meats, puddings, etc.

The product is also useful as a flavoring coating on cereals, snack foods, and the like.

EXAMPLE I

Matured coconuts were cracked and inspected for freshness. Any "slimy" or off-colored coconuts were discarded. The coconut meat was removed from the shell and care was taken to remove as much of the germ eye as practical. The meat was ground in a Hobart* meat grinder with ¼ inch perforations in the dieplate. The ground meat was passed to a Fitzpatrick* mill (hammer mill) with a 0.033 inch screen and ground using only the hammer action. Water in an amount of 25% of the weight of the coconut meat was added during this grinding step.
*Trademark The ground pulp was fed to a Chisholm Ryder* screw press operated at 30 lbs/inch$^2$ backpressure with a 0.02 inch screen and the flavor liquor was collected therefrom. The "cake" from the press was mixed with 90° F. water (25–40% based on the weight of the cake) in a ribbon blade blender with about 2 minutes residence time to produce a slurry.

The slurry was pressed in an FMC* screw press operated at 50 lbs/inch$^2$ backpressure and with a 0.023 inch screen. The flavor liquor was collected and combined with the flavor liquor collected from the Chisholm Ryder* press.
*Trademark The combined flavor liquor was filtered through a Brown* screw and paddle finisher with a 0.01 inch screen so that the finished flavor liquor had no more than 2% fiber therein. The finished liquor was heat-treated in a dairy HTST heat-treating apparatus at 175° F. for 23 seconds to deactivate enzymes in the liquor, and 6500 gals. of liquor with 17% solids was collected.
*Trademark The deactivated liquor was passed through a double-effect evaporator with a preheat of 160° F. for 1 minute, 145° F. in the first stage, and 119° F. in the second stage, all being operated at atmospheric pressure. The condensed liquor had 32% solids. The condensed liquor was homogenized in a Manton-Gaulin* homogenizer operated at 1500 lbs/inch$^2$. This liquor was placed in a holding tank. The carriers were dissolved in water in a Lanco* dissolver wherein atmospheric steam was injected to bring the solution to 170° F. for 10 minutes. Then the carrier solution and liquor were compounded in a swept wall kettle. The compounded liquor had, on a solids basis, the following composition:

| Nonfat dry milk solids | 2% |
| Sodium Caseinate | 3% |
| Distilled Mono-glycerides | .5% |
| Coconut liquor | 94.5% |

The compounded liquor was again homogenized as above.
*Trademark

The homogenized and compounded liquor was spray-dried in a Marriot-Walker* box drier. The liquor was preheated to 160° F. and the drier had an inlet temperature of 310° F., and outlet temperature of 180° F. and a 67/17 nozzle. The spray-dried product was sifted through a 6 mesh screen and packaged in bags.
*Trademark

EXAMPLE II

A sugar center caramel confectionary was prepared by mixing 71% microfine sugar and 25% (92°–98° F.) coconut fat with 4% of the powder of Example I. The mixture was placed in the center of a caramel candy, rolled and cut into individual candies. In chewing the candy, the center was highly coconut flavored, was not gritty and had a smooth mouth feel.

The invention is illustrated by the foregoing examples, but it is to be understood that the invention is not restricted thereto, but extends to the scope of the foregoing disclosure and following claims. In the examples as well as in the foregoing disclosure and following claims, all percentages and parts are by weight unless otherwise specified.

What is claimed is:

1. A process for producing reconstitutable natural coconut flavor comprising:
    (1) grinding coconut meat to an average particle size of 2000 microns or less and until a pulp containing coconut flavor liquor is obtained;
    (2) separating the coconut flavor liquor from the coconut meat fiber wherein the separated liquor has no more than 2% fiber therein;
    (3) deactivating enzymes in the flavor liquor by heating the flavor liquor at a temperature and for a time within enzyme deactivation conditions, whereby enzymes in the liquor are deactivated; and
    (4) concentrating the deactivated liquor to a concentrated form by at least one step selected from (a) condensing the liquor to more than 25% solids, or (b) spray-drying the liquor to a free-flowing powder;
whereby a concentrated coconut flavor is obtained.

2. The method of claim 1 wherein the coconuts from which the coconut meat is obtained are matured coconuts.

3. The method of claim 1 wherein the germ eye of the coconuts from which the coconut meat is obtained has been at least partially removed.

4. The method of claim 1 wherein the grinding of the coconut meat is at least partially by impact grinding.

5. The method of claim 1 wherein the ground pulp is pressed to expel liquor from the pulp.

6. The method of claim 5 wherein the pressing is by one or more of a screw press, flat plate press, roller press and plate and frame filter press or centrifuge.

7. The method of claim 6 wherein the pulp is pressed during the separating step.

8. The method of claim 1 wherein the separated coconut meat fiber is resuspended in hot water and recycled through at least the separation step to extract more flavor liquor therefrom.

9. The method of claim 1 wherein the concentration step is that of condensing the liquor.

10. The method of claim 9 wherein sugar is mixed with the condensed liquor and the mixture is packaged to provide a sweet and condensed, self-preserving reconstitutable coconut flavor.

11. The method of claim 9 wherein the condensed liquor is spray-dried to a shelf-stable, free-flowing reconstitutable coconut flavor powder.

12. The method of claim 1 wherein the concentration step is by spray-drying the liquor to a shelf-stable, free-flowing reconstitutable coconut flavor powder.

13. The method of claim 11 or 12 wherein the spray-dried powder has a moisture content of 5% or less.

14. The method of claim 13 wherein the spray-dried powder is chilled prior to being packaged.

15. The method of claim 11 or 12 wherein prior to spray-drying the liquor is mixed with a carrier.

16. The method of claim 11 or 12 wherein prior to spray-drying the liquor is homogenized.

17. The method of claim 1 wherein the coconut flavor consists essentially of a mixture of coconut fat, coconut protein and coconut carbohydrates.

18. The method of claim 1 where the deactivation of the enzymes is carried out in short-time-high-temperature heat treating apparatus.

19. A concentrated, reconstitutable, natural coconut flavor comprising a mixture of coconut fat and coconut protein/carbohydrate in ratios of 40–72:60–28, wherein the flavor when reconstituted to a solids content comparable to the solid contents of natural coconut flavor liquor, contains less than 2% coconut fiber and the coconut enzymes have been deactivated.

20. The flavor of claim 19 wherein the concentrated form is a condensed form having at least 25% solids.

21. The flavor of claim 20 also containing sugar to provide a sweetened and condensed self-preserving form.

22. The flavor of claim 19 in a free-flowing, powdered, shelf-stable, spray-dried form having 5% moisture or less.

23. The flavor of claim 19 or 20 or 21 or 22 in admixture with a food composition which normally contains a coconut flavoring.

* * * * *